United States Patent [19]

Uchimura et al.

[11] Patent Number: 4,660,667
[45] Date of Patent: Apr. 28, 1987

[54] MULTI-RANGE LOAD CELL SCALES

[75] Inventors: Mitsuo Uchimura; Tsutomu Masuyama, both of Numazu, Japan

[73] Assignee: Tokyo Electric Co. Ltd., Tokyo, Japan

[21] Appl. No.: 858,066

[22] Filed: Apr. 30, 1986

[30] Foreign Application Priority Data

May 15, 1985 [JP] Japan .................................. 60-103529

[51] Int. Cl.⁴ ......................... G01G 23/14; G01G 3/14
[52] U.S. Cl. ..................................... 177/164; 177/211
[58] Field of Search ......................... 177/164, 211, 229

[56] References Cited

U.S. PATENT DOCUMENTS 4,037,675  7/1977  Storace et al. ...................... 177/229
4,307,787 12/1981  Raboud et al. .................. 177/211 X Primary Examiner—George H. Miller, Jr.
Attorney, Agent, or Firm—Frishauf, Holtz, Goodman & Woodward

[57] ABSTRACT

A multi-range load cell scale includes heavy- and light-range load cells. For the load weight below a predetermined value, the scale displays the weight data based on the output signal from the light-range load cell. For the load weight above a predetermined value, the scale displays the weight data based on the output signal from the heavy-range load cell. As for change of the load cell from light-range to heavy-range, when it is detected that the weight data WH based on the output signal from the heavy-range weighing load cell is smaller than the weight data WL based on the output signal from the light-range weighing load cell, weight data equal to the weight data WL at the switching point is displayed, in place of the weight data WH.

7 Claims, 4 Drawing Figures

MULTI-RANGE LOAD CELL SCALES

BACKGROUND OF THE INVENTION

This invention relates to a multi-range load cell scale which comprises a light-weight measuring load cell and a heavy-weight measuring load cell, and which displays the output of the light-weight measuring load cell when the weight of the measured object is not greater than a predetermined value and displays the output of the heavy-weight measuring load cell when the weight is greater than a predetermined value.

In this specification, the multi-range load cell scale means a scale with a plurality of load cells for measuring weight in different scale ranges which are continuously coupled with one another.

An example of a multi-range load cell scale has two load cells. The weighing range of the first load cell is 0 to 2.5 kg, and the unit weight or one scale division is 1 g in this range. In measuring weight of 2.5 kg or less, the output from the first load cell for light weight measurement is displayed for measured weight indication. The weighing range of the second load cell is 2.5 kg to 10 kg, and the unit weight is 5 g in this range. In measuring weight of greater than 2.5 kg but not more than 10 kg the output of the second load cell for heavy weight measurement is displayed. In this type of a multi-range load cell scale, due to the different weighing characteristics of both load cells, there is a problem with non-continuous displays occurring in the vicinity of the borderline between the two range (hereinafter called switching point). For example, if the load weight is increased successively, the weight reading displayed may increase suddenly at the switching point, or a reading lower than the preceding reading may be displayed. This problem will be discussed in detail, referring to FIG. 1. First of all, the required conditions will be given. One scale division of the light-weight measuring or light-range load cell is 1 g. If the weight displayed is 2500 g, the true value of the load weight is in the range of 2500±0.5 g. One scale division of the heavy-weight measuring or heavy-range load cell is 5 g. If the weight displayed is 2500 g, the true value of the load weight is in the range of 2500±2.5 g.

In FIG. 1, when the true weight value and the displayed weight value form a continuous line, as indicated by straight line A, an ideal display condition is obtained and no problem of discontinuity occurs at the switching point. When an instrumental error, or an inherent error of each load cell causes readings of equal amounts above or below the true value, the weighing characteristic has a variation along straight line B or C. Therefore, also in this case, there is no problem with discontinuity.

An extreme example of displayed weight change at the switching point will be explained. Suppose the light-weight measuring load cell of the scale has characteristic as shown by straight line B, and the heavy-weight measuring load cell has characteristic as shown by straight line E. In this case, when the measured weight of the light-weight measuring load cell exceeds the switching point of 2500 g, the weighing characteristic of this load cell shifts from straight line B, along straight line F, to straight line E. At this point where straight line F meets straight line E, the measured weight is 2503 g. Since this value falls within the 2505±2.5 g range, the displayed weight is 2505 g. The weighing range in which the output of this load cell scale will be displayed as 2500 g is exceedingly narrow. However, this is the unavoidable lot of the multi-range load cell scale.

Here is another example. Suppose the light-weight measuring load cell has the characteristic shown by straight line C, and the heavy-weight measuring load cell has the characteristic by straight line D. In this case, when the measured weight value exceeds 2500 g, the weighing characteristic is shown by straight line G, and shift to straight line D. To be more specific, at the point where straight line G meets straight line D, the measured weight is 2497 g. This value falls within the range of 2495±2 g. Therefore, the displayed weight is 2495 g. If a load weight is then increased by 0.5 g, the displayed weight will be 2500 g according to the output of the heavy weight load cell. Thus, the displayed weight will be 2499 g, 2500 g, 2495 g, 2500 g, and 2505 g according as the load weight increases. The sequence of the displayed weight increases is irregular. The decrease in the displayed weight at the switching point is very serious problem for scales.

SUMMARY OF THE INVENTION

An object of this invention is to provide a multi-load cell scale which prevents the displayed weight based on the output of a heavy-range load cell from being greatly reduced from the displayed weight based on the output of the light-range load cell at the switching point.

The above object is achieved by a multi-range load cell scale comprising: light- and heavey-range load cells for producing output signals according to load weight; weight data generating circuit for converting the output signals output from the light- and heavy-range load cells into weight data; display device; and data processor for receiving the weight data from the weight data generating circuit and for selectively displaying on the display device the weight data based on the output signals from the light- and heavy-range load cells according to the weight data based on the output signal from a selected one of the light- and heavy-range load cells being above or below a predetermined value, and for displaying the weight data equal to a predetermined value when the weight data based on the output signal from the selected one of the light- and heavy-range load cell is above the predetermined value and the weight data based on the output signal from the heavy-range load cell is not larger than the predetermined value.

This object can also be achieved by a multi-range load cell scale comprising: light- and heavy-range load cells for producing output signals according to load weight; weight data generating circuit for converting the output signals output from the light- and heavy-range load cells into weight data; display device; and data processor for receiving the weight data from the weight data generating circuit and for displaying on the display device the weight data based on the output signal from the light- or heavy-range load cell when the weight data based on the output signal from a selected one of the light- and heavy-range load cells is not greater than a first predetermined value or not less than a second predetermined value, and for displaying on the display device the weight data based on the output signal of the light- or heavy-range load cell depending upon the difference between the weight data based on the output signals from the light- and heavy-range load cells being above or below a predetermined amount.

DETAILED DESCRIPTION OF THE PREFERRED EMBODIMENTS

Figure 1:
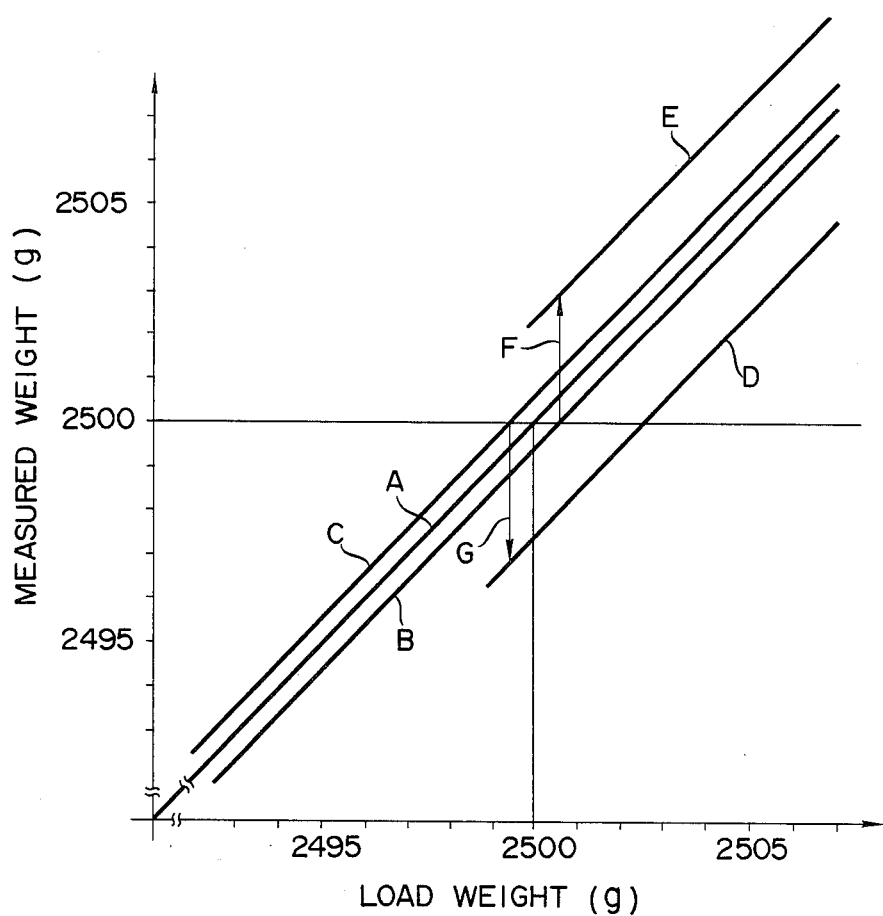
FIG. 1 shows a graph illustrating a relationship between measured weight and load weight in light- and heavy-ranges of a conventional multi-load cell.
Figure 2:
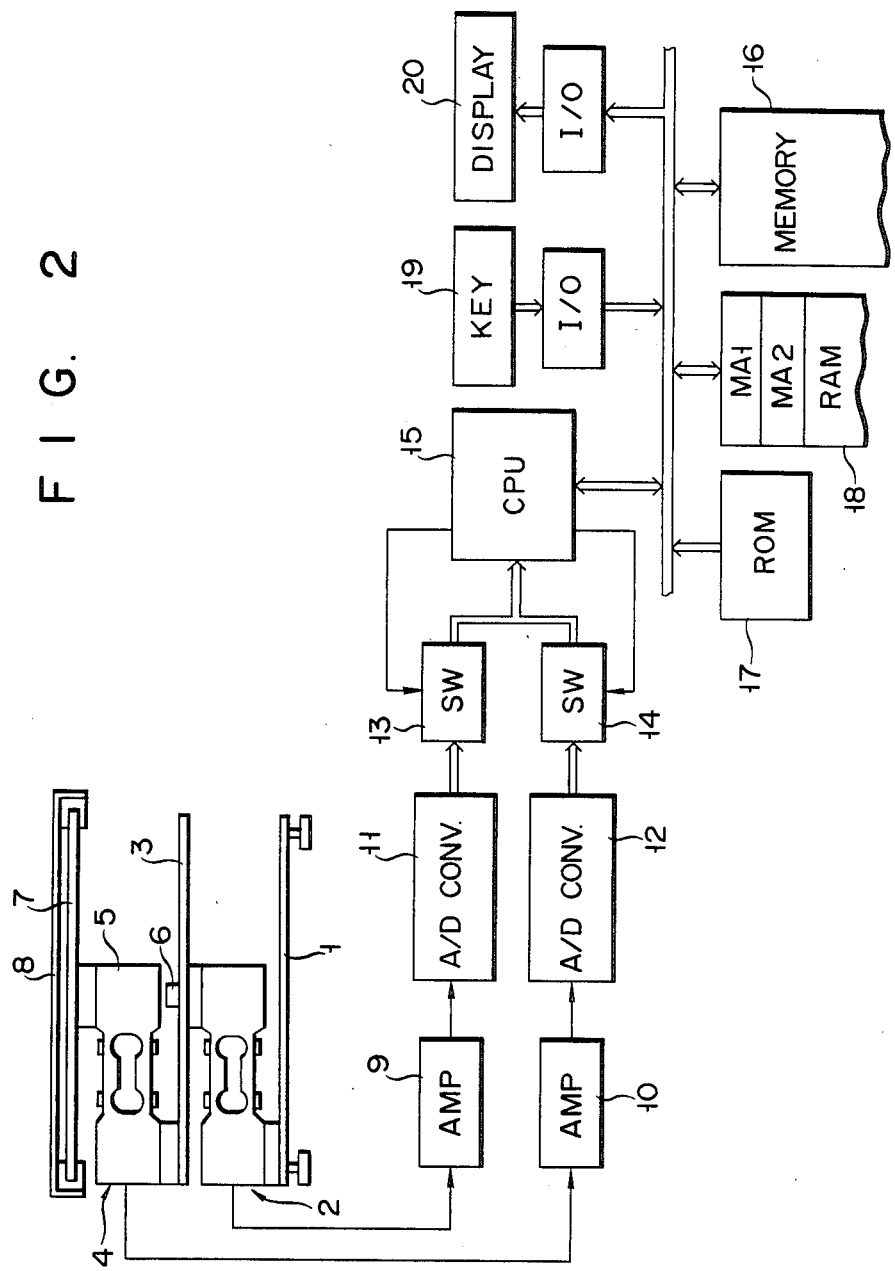
FIG. 2 shows, in schematic and block form, a configuration of a multi-load cell scale according to an embodiment of this invention.

A preferred embodiment of this invention will be described referring to FIG. 2. The mounting fitting for heavy-range load cell 2 is fixed to the top of base plate 1. Middle frame 3 is mounted on the top of the free end of this low-sensitivity, heavy-range load cell 2. The mounting fitting for high-sensitivity, light-range load cell 4 is fixed to the top of middle frame 3. Stopper 6 is fixed to the top of the middle frame, below the free end of light-range load cell 4, and limits variations of load cell 4 above a fixed measurement. For example, if load weight of 2.7 kg is applied to the scale, the free end of load cell 4 comes in contact with stopper 6, to prevent any further variation of load cell 4. Frame 7 is coupled with low-range load cell 4. Plate 8 is placed on frame 7.

Load cells 2 and 4 are coupled with CPU 15, respectively through amplifiers 9 and 10, A/D converters 11 and 12, and load cell output selectors 13 and 14. CPU 15 is further connected to nonvolatile memory 16, ROM 17, RAM 18, operation key 19, and display device 20. ROM 17 stores programs to be executed by CPU 15. RAM 18 temporarily stores the operation results from CPU 15. Nonvolatile memory 16 stores characteristic data such as span data and zero-point data representing the characteristics of load cells 4 and 5.

Figure 3:
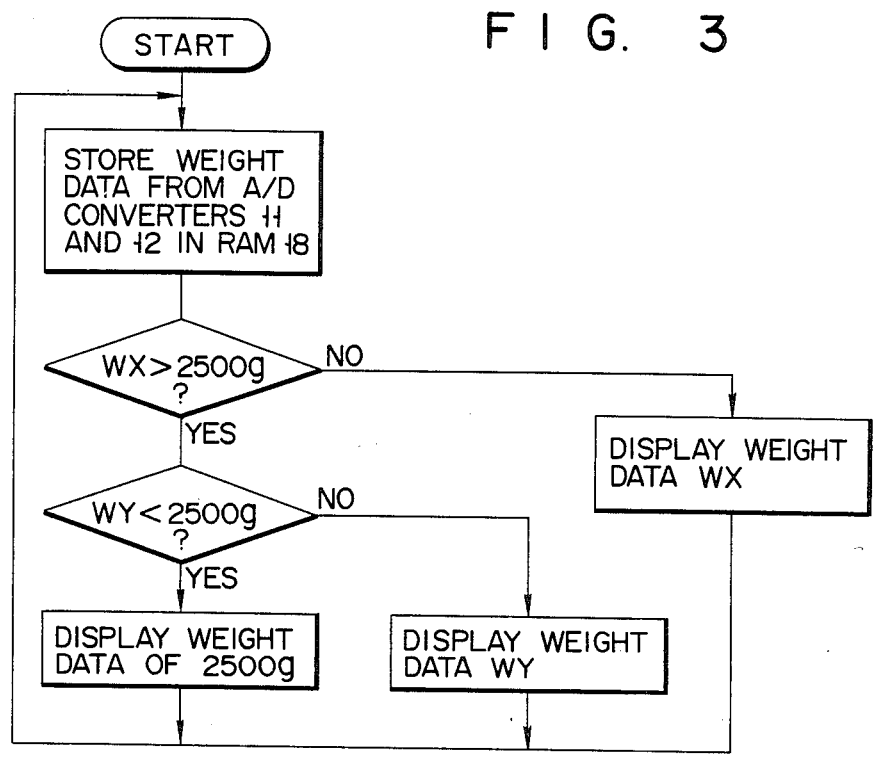
FIG. 3 shows a flowchart explaining the operation of the multi-load cell shown in FIG. 2.

When load weight of 2.5 kg and 30 kg are applied to load cells 2 and 4, respectively and if these produce the same rated output voltages, then, A/D converters 11 and 12 produce the same digital data or count data. The operation of the multi-load cell scale shown in FIG. 2 will be described referring to FIG. 3. It is assumed that the switching point between load cells 2 and 4 is set at 2500 g. First, at the time of weighing, switches 13 and 14 are closed at different timings, and the weight data from load cells 2 and 4 are stored in RAM 18. When one of switches 13 and 14 is closed, one of the output signals from load cells 2 and 4 is supplied through amplifier 9 or 10 and A/D converter 11 or 12. After being converted into digital data, it is supplied through one of switches 13 and 14 to CPU 15. CPU 15 stores this received weight data in the first memory area (MA1) or the second memory area (MA2) of RAM 18. If the data WX from load cell 4 is below 2500 g, the weight data output from light-range load cell 4 is displayed. If the data WX is greater than 2500 g, the weight data dependent on the output of heavy-range load cell 2 is displayed. However, if the weight data WX obtained from load cell 4 is greater than 2500 g, and the weight data WY as obtained from load cell 2, is not greater than 2500 g, with the characteristic as mentioned above, CPU 15 will prevent the display of weight data that corresponds to the output of load cell 2, and simply display 2500 g weight data on display device 20. Thus, the weight display data at the switching point will not decrease with an increase of the measured weight.

Figure 4:
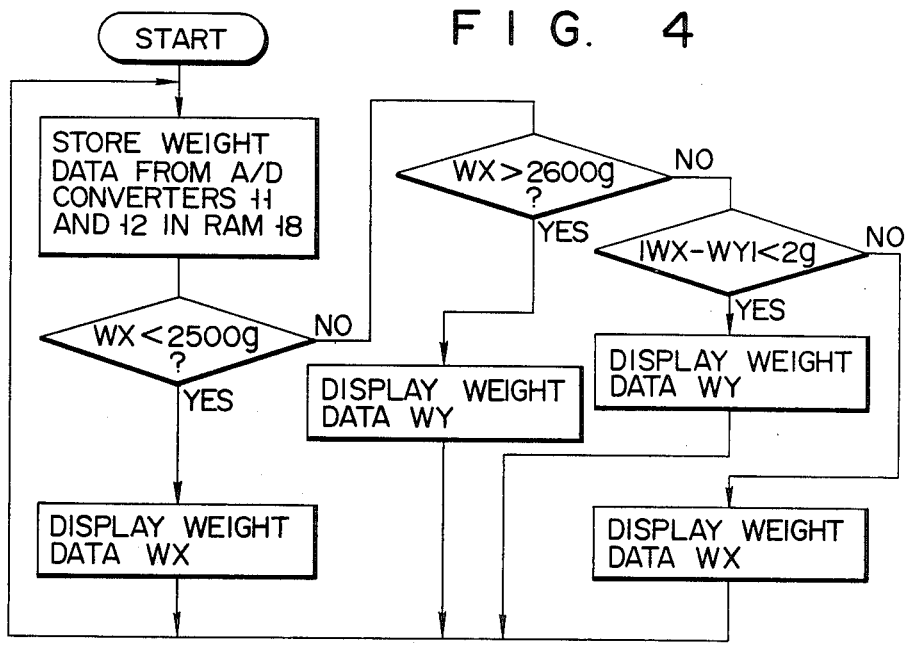
FIG. 4 shows a flowchart explaining the operation of a multi-load cell scale which is configured according to embodiment of this invention, but has a similar configuration to that of the scale shown in FIG. 2.

Next, the operation of another embodiment of this invention will be explained with reference to FIG. 4. In this data processing operation, instead of fixing the switching point at one point, a range of 2500 to 2600 g is used as the range where the measurements by the load cells can be switched. The difference between the weight data based on the output of light-range load cell 4 and that based on the output of heavy-range load cell 2 is first detected. If this difference is more than a preset value e.g. 2 g, the weight data based on the output of light-range load cell 4 is displayed by display device 20. If less than 2 g, the weight data based on the output of heavy-range load cell is displayed. This measurement is determined on the assumption that if the difference is more than 2 g, the weight data based on the output from load cell 4 is more reliable than that based on the output from load cell 2, and therefore the former weight data should be selected. In contrast, if the difference is less than 2 g, both weight data are reliable, and the weight data based on the output from load cell 2 which is less subject to blinking as compared with the weight data based on the output from load cell 4 is selected. As described above, if the measured value of the light-range load cell 4 is less than 2500 g or more than 2600 g, the output of the load cell 4 or 2 is displayed, respectively. If the measured value is between 2500 and 2600 g, the difference between weight data based on the outputs of load cells 2 and 4 is detected and, depending upon whether the detected difference is greater or less than 2 g, the output of either load cell 4 or 2 is used. As a result, the displayed weight substantially successively increases as the load weight increases.

While this invention has been described using specific embodiments, it may variously be changed and modified within the scope of this invention. For example, in the above-mentioned embodiments, light-range load cell 4 is placed above the heavy-range load cell 2, but their locations may be reversed. Alternatively, amplifier 10 and A/D converter 12 can be omitted, and by connecting switches 13 and 14 between amplifier 9 and load, cells 2 and 4 the output signals of load cells 2 and 4 can be selectively supplied to amplifier 9.

Further, the output signal of load cell 2 can be used instead of that of load cell 4, the weight data corresponding to one of the output signals of the load cells 2 and 4 can be selectively displayed depending on whether weight data corresponding to the output signal from load cell 2 is greater or less than 2500 g.

What is claimed is:

1. A multi-range load cell scale comprising:

light- and heavy-range load cells for producing output signals according to load weight;

weight data generating means for converting the output signals output from said light- and heavy-range load cells into weight data;

display means; and data processing means for receiving the weight data from said weight data generating means and for selectively displaying on said display means the weight data based on one of the output signals from said light- and heavy-range load cells according to the weight data based on the output signal from one of said light- and heavy-range load cells being above or below a predetermined value, and for displaying the weight data equal to a predetermined value when the weight data based on the output signal from the one of said light- and heavy-range load cells is not less than said predetermined value and the weight data based on the output signal from said heavy-range weighing load cell is not greater than said predetermined value.

2. A multi-range load cell scale according to claim 1, in which said light-range load cell is a load cell mounted on said heavy-range load cell, and having a higher sensitivity than that of said heavy-range load cell.

3. A multi-range load cell scale according to claim 2, in which said weight data generating means includes first and second analog/digital converting means for converting the output signals from said heavy- and light-range load cells into digital data, and switching means for selectively supplying one of the output data from said first and second analog/digital converting means to said data processing means.

4. A multi-range load cell scale according to claim 1, in which said weight data generating means includes first and second analog/digital converting means for converting the output signals from said heavy- and light-range weighing load cells into digital data, and switching means for selectively supplying the output data from said first and second analog/digital converting means to said data processing means.

5. A multi-range load cell scale comprising:
heavy- and light-range load cells for producing output signals according to load weight;
weight data generating means for converting the output signals output from said heavy- and light-range load cells into weight data;
display means; and
data processing means for receiving the weight data from said weight data generating means and for displaying on said display means the weight data based on one of the output signals from said heavy- and light-range load cells when the weight data based on the output signal from one of said heavy- and light-range load cells is below a predetermined value or above a second predetermined value, and for displaying on said display means the weight data based on the output signal of said heavy- or light-range load cell depending upon the difference between the weight data based on the output signals from said heavy- and light-range load cells being above or below a predetermined amount.

6. A multi-range load cell scale according to claim 5, in which said light-range load cell is a load cell mounted on said heavy-range weighing load cell, and having a higher sensitivity than that of said heavy-range load cell.

7. A multi-range load cell scale according to claim 5, in which said weight data generating means includes first and second analog/digital converting means for converting the output signals from said heavy- and light-range load cells into digital data, and switching means for selectively supplying the output data from one of said first and second analog/digital converting means to said data processing means.

* * * * *